United States Patent [19]
Hazama

[11] Patent Number: 5,551,814
[45] Date of Patent: Sep. 3, 1996

[54] CRANKSHAFT MILLING MACHINE CONTROL SYSTEM

[75] Inventor: Masanori Hazama, Komatsu, Japan

[73] Assignee: Kabushiki Kaisha Komatsu Seisakusho, Tokyo, Japan

[21] Appl. No.: 325,174

[22] PCT Filed: Oct. 25, 1993

[86] PCT No.: PCT/JP93/01537

§ 371 Date: Apr. 20, 1995

§ 102(e) Date: Apr. 20, 1995

[87] PCT Pub. No.: WO94/09935

PCT Pub. Date: May 11, 1994

[30] Foreign Application Priority Data

Nov. 5, 1992 [JP] Japan ................................ 4-296068

[51] Int. Cl.$^6$ ................................ B23C 3/06; B23Q 15/18
[52] U.S. Cl. ................................ 409/200; 29/6.01; 82/106; 82/900
[58] Field of Search ................................ 29/6, 27 R, 27 C; 409/113, 135, 136, 165, 199, 200, 198, 134; 82/900, 131, 118, 100; 451/25

[56] References Cited

U.S. PATENT DOCUMENTS

| | | | |
|---|---|---|---|
| 3,717,962 | 2/1973 | Kusakabe et al. | 451/25 |
| 4,103,588 | 8/1978 | Schmid | 409/136 |
| 4,110,055 | 8/1978 | Blaimschein et al. | 409/199 X |
| 4,157,055 | 6/1979 | Marzy | 409/113 |
| 4,326,323 | 4/1982 | Kralowetz et al. | 29/6 |
| 4,790,698 | 12/1988 | Heffron | 409/200 |

FOREIGN PATENT DOCUMENTS

| | | |
|---|---|---|
| 56-56315 | 5/1981 | Japan. |
| 4-45798 | 10/1992 | Japan. |

OTHER PUBLICATIONS

JP, A, 62–255007, Nov. 6, 1987, line 9, upper right column to line 1, lower right column, p. 3.
JP, A, 56–56315, May 18, 1981, line 11, upper right column, p. 3 to line 11, upper right column, p. 4.
JP, Y2, 4–45798, Oct. 28, 1992, lines 1 to 11, right column, p. 3, line 12, left column to line 3, right column, p. 4.

Primary Examiner—William Briggs
Attorney, Agent, or Firm—Nikaido Marmelstein Murray & Oram LLP

[57] ABSTRACT

Processing accuracy varying with thermal displacement of a machine body is automatically, rapidly adjusted. There is provided a temperature detector for detecting temperature in the vicinity of a bearing for an inner-tooth milling cutter. Based on the temperature detected by the temperature detector, temperature-related correction data to be used for correction of basic processing data is computed. In this case, the correction data related to the diameter of the circular path followed by the center of the inner-tooth milling cutter is obtained by calculating a magnification with respect to the basic processing data, while the correction data related to the center of the circular path is obtained by calculating a deviation from the basic processing data.

3 Claims, 4 Drawing Sheets

6,551,814

CRANKSHAFT MILLING MACHINE CONTROL SYSTEM

TECHNICAL FIELD

The present invention relates to a crankshaft milling machine control system for preventing deterioration of machining accuracy caused by, for example, displacement of a machine body due to heat generation.

BACKGROUND ART

There are known crankshaft milling machines as a machine tool for cutting the pin part or journal part of crankshafts for use in an internal combustion engine. In a crankshaft milling machine, reciprocating tables (saddles) that reciprocate in a lengthwise direction of a bed are provided; slides are so supported as to be slidable in a direction perpendicular to the reciprocating direction of the reciprocating tables; and a spindle head with an inner-tooth milling cutter is supported on the slides such that it can rock or move up and down freely. In such a crankshaft milling machine, the inner-tooth milling cutter is set in circular motion through a combination of the rocking movement or vertical movement of the spindle head and the horizontal movement of the slides. The inner-tooth milling cutter in circular motion performs cutting operation on the pin part and journal part of the crankshaft fixedly supported at both ends thereof.

When a workpiece such as a crankshaft is cut by means of the above-described crankshaft milling machine, the thermal change of the machine itself occurs with the passage of time, causing such an undesirable situation that the sizes of a finished article exceed specified tolerances. In order to solve this problem, conventional milling machines are designed such that initial values for processing data are preliminarily set to the lower limits of the allowable ranges in case thermal displacement would occur, so that the sizes do not exceed upper limits even if thermal displacement of the machine body occurs. However, even though initial values are arranged as described above, the sizes of a finished article unavoidably exceed their tolerances in some cases. In these cases, the machine is stopped to manually input correction data in the NC device. Alternatively, processing data is recalculated whenever correction is carried out particularly in cases where there arises a need for changing the path followed by the inner-tooth milling cutter which performs circular motion. Manually inputting correction data or recalculation of processing data for every correction disadvantageously brings about a decrease in the efficiency of machining operation, since the machine has to be stopped for every correction or it takes a time for calculation.

The present invention has been made in order to overcome the foregoing problems and one of the objects of the invention is therefore to provide a system for controlling a crankshaft milling machine, which is capable of automatically, rapidly correcting processing data according to thermal displacement of a machine body to ensure high accuracy.

DISCLOSURE OF THE INVENTION

According to the invention, there is provided a system for controlling a crankshaft milling machine wherein the vertical movement and horizontal movement of a spindle head having an inner-tooth milling cutter are combined to put the inner-tooth milling cutter in circular motion, thereby cutting a workpiece fixedly supported at both ends thereof, the control system comprising as shown in FIG. 1:

(a) basic processing data setting means for setting basic processing data for the workpiece related to a diameter of a circular path followed by the center of the inner tooth milling cutter and to the center of the circular path in accordance with input work data;

(b) spindle head controlling means for controlling the vertical movement and horizontal movement of the spindle head in accordance with the output of tile basic processing data setting means;

(c) temperature detecting means for detecting the temperature of the crankshaft milling machine at a specified position during machining operation;

(d) temperature-related correction data computing means for looking up temperature-related processing data in a table with the output of the temperature detecting means and computing temperature-related correction data from the comparison between the temperature-related processing data and the basic processing data; and (e) processing data correcting means for correcting the basic processing data for the workpiece set by the basic processing data setting means in accordance with the temperature-related correction data computed by the temperature-related correction data computing means.

According to such a crankshaft milling machine control system, the temperature of a crankshaft milling machine is detected at a specified position by the temperature detecting means during machining operation. The temperature-related processing data corresponding to the detected temperature is obtained from a table and the temperature-related correction data computing means computes the temperature-related correction data by comparing the temperature-related processing data to the basic processing data. Based on the temperature-related correction data thus obtained, the basic processing data is corrected by the processing data correcting means. Then, the spindle head controlling means controls the vertical movement and horizontal movement of the spindle head based on the corrected basic processing data. The temperature-related correction data is thus obtained by comparing the temperature-related processing data to the basic processing data so that machining accuracy which varies due to thermal displacement of the machine body can be rapidly corrected with high accuracy.

Preferably, the temperature-related correction data computing means computes the temperature-related correction data associated with the diameter of the circular path followed by the center of the inner-tooth milling cutter, by calculating the magnification of the diameter according to the temperature-related processing data with respect to the diameter according to the basic processing data. It also computes the temperature-related correction data associated with the center of the circular path followed by the center of the inner-tooth milling cutter, by calculating the deviation of the center according to the temperature-related processing data from the center according to the basic processing data. This enables it to prepare the temperature-related correction data in a short time utilizing the basic processing data and therefore to rapidly perform the control of the spindle head based on the correction data.

The specified position where temperature is detected by the temperature detecting means is preferably in the vicinity of the bearing part of the inner-tooth milling cutter, which enables it to accurately measure the fluctuation of heat generated during processing which adversely affects the machining accuracy, so that high-accuracy correction can be achieved.

Other objects of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a schematic perspective view of a crankshaft milling machine according to the embodiment of the invention;

FIG. 3 is a front view of the essential part of the crankshaft milling machine according to the embodiment of the invention; and FIG. 4 illustrates the comparison between basic processing data and temperature-related data/accuracy-related data for with the crankshaft milling machine according to the embodiment of the invention.

BEST MODE FOR CARRYING OUT THE INVENTION

Referring now to the accompanying drawings, a preferred embodiment of a crankshaft milling machine control system according to the invention will be hereinafter described.

Figure 1:
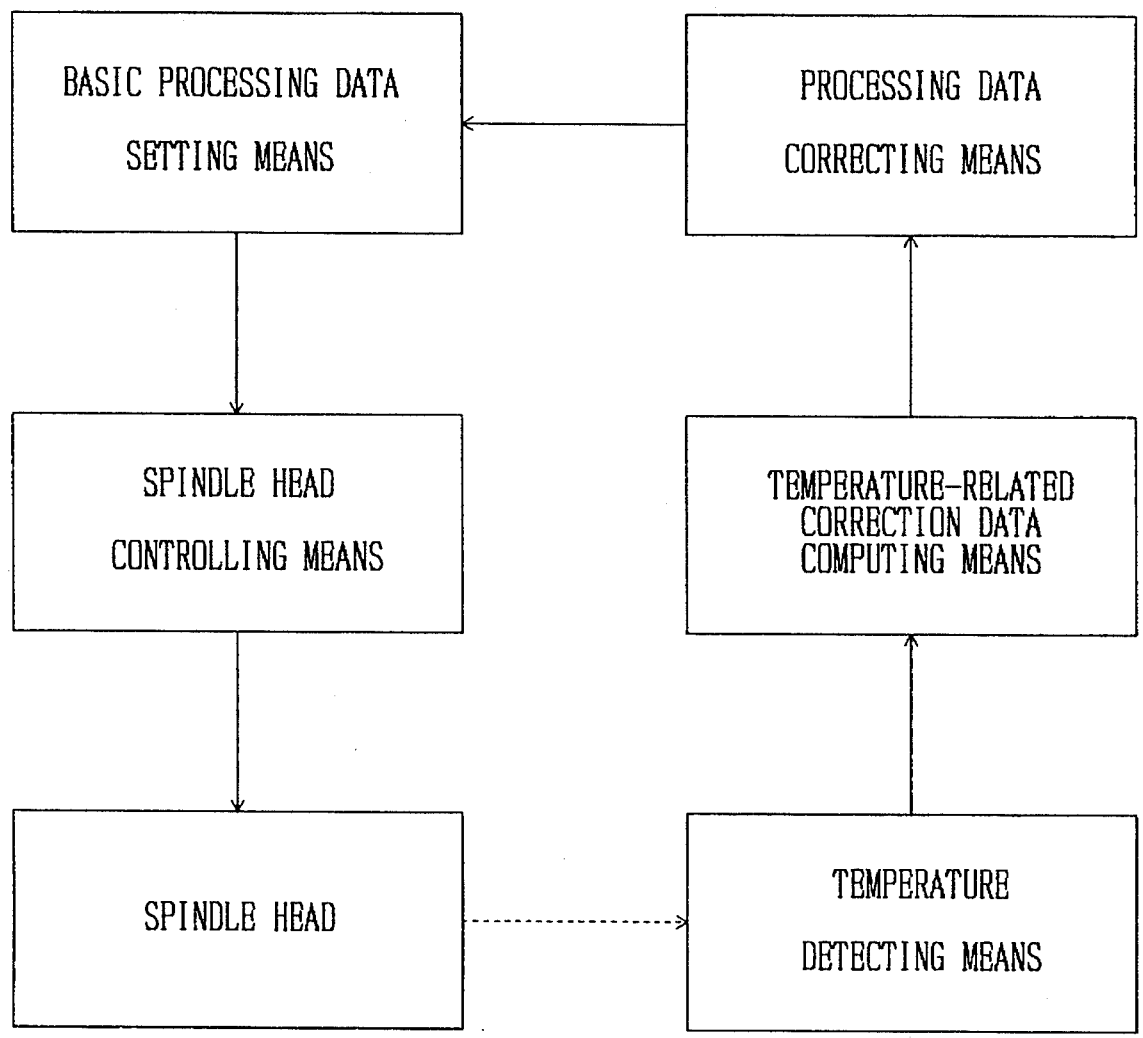
FIG. 1 shows the whole construction of the invention.
Figure 2:
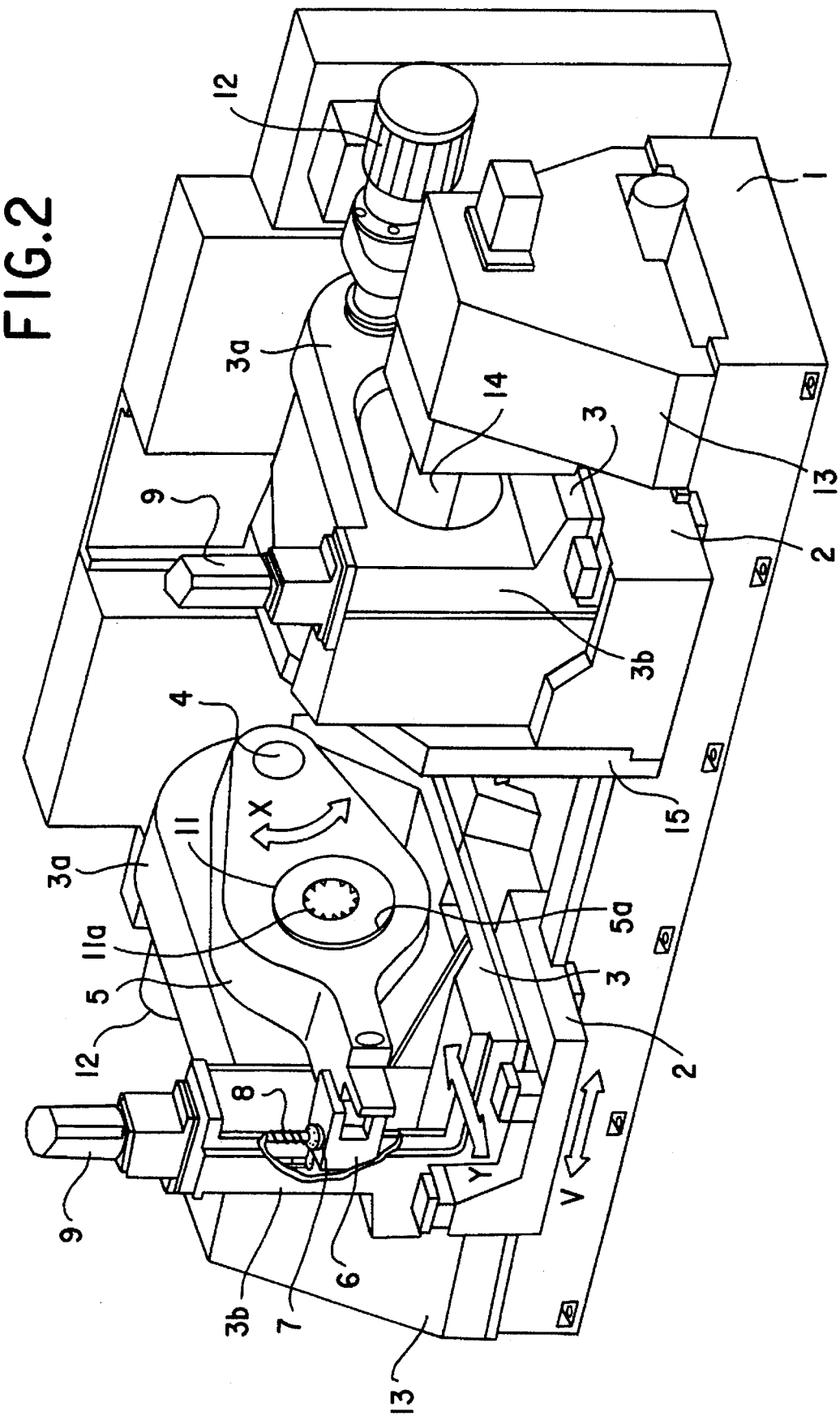
FIGS. 2 to 4 provide illustrations of a crankshaft milling machine control system according to one embodiment of the invention.

FIG. 2 shows a crankshaft milling machine provided with a horizontally arranged bed 1 on which two saddles 2 are so disposed as to be movable in a lengthwise direction (i.e., the direction of V axis) of the bed 1. Supported on the saddles 2 are slides 3 which are slidable in a direction (i.e., the direction of Y axis) perpendicular to the moving direction of the saddles 2. Each slide 3 has an upright supporting wall 3a extending in the sliding direction (the direction of Y axis) of the slides 3. Each supporting wall 3a has, at one end thereof, a prismatic tubular case 3b extending in a vertical direction. At the other end of the supporting wall 3a opposite to the case 3b, a spindle head 5 of substantially oval shape in cross section is supported by a pin 4 which is horizontally disposed in the direction of V axis, in such a manner that the spindle head 5 can rock freely. The end of the spindle head 5 facing to the case 3b is supported such that the spindle head 5 is slidable in the direction of Y axis, by means of a guide 6 which is so accommodated in the case 3b as to be movable vertically.

The guide 6 is screwed into a ball screw shaft 8 by means of a nut 7 fixed to the guide 6, the shaft 8 being vertically disposed within the case 3b. The ball screw shaft 8 is forwardly and reversely rotated by a motor for rocking movement 9 attached to the upper end of the case 3b so that the spindle head 5 rocks on the pin 4 in the direction of X axis.

Figure 3:
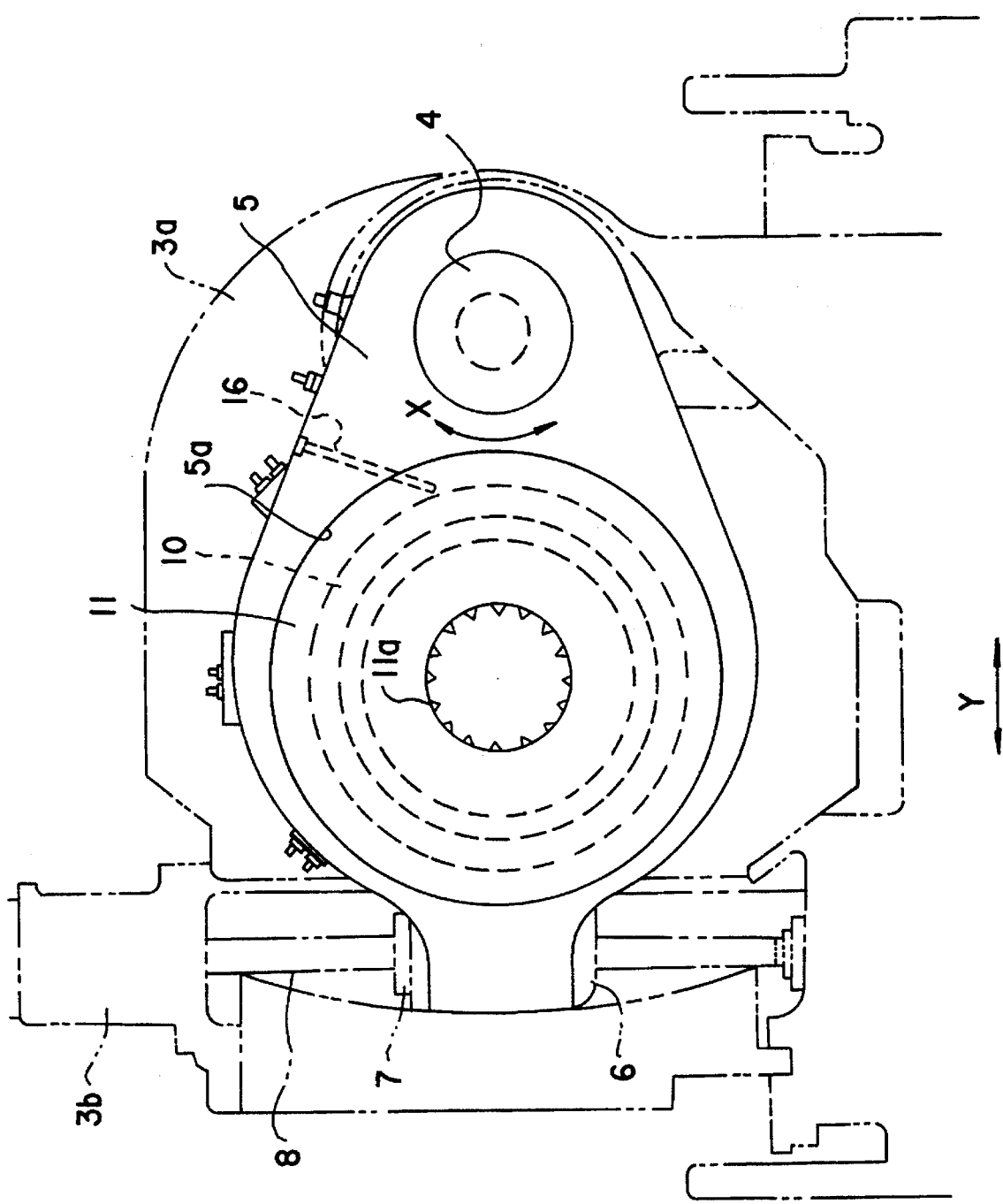

As shown in FIG. 3, the spindle head 5 has a circular hole 5a into which a crankshaft (i.e., workpiece) not shown can be inserted. In the circular hole 5a, an inner-tooth milling cutter 11 (hereinafter referred to as "cutter") is rotatably supported with the help of a bearing 10. The cutter 11 includes cutting teeth 11a arranged on the inner peripheral thereof and is coupled to a cutter motor 12 through a gearbox (not shown) and through a rotary shaft rotatably supported at the center of the pin 4, so that the cutter 11 can be rotated by the rotation of the cutter motor 12.

There are provided work heads 13 on both ends of the bed 1 and these work heads 13 are provided with chucks 14 respectively for retaining both ends of the workpiece. Reference numeral 15 in FIG. 2 denotes a rest for supporting the workpiece during machining operation.

Next, the operation of the crankshaft milling machine having the above-described construction will be described.

A crankshaft to be subjected to cutting is fixed, being retained by the opposed chucks 14 at both ends. Then, the two saddles 2 are moved in the direction of V axis to a machining position and a side of a part to be processed is supported by the rest 15. The motor for rocking movement 9 and a slide motor (not shown) for bringing the slides 3 into reciprocating motion are forwardly and reversely rotated in synchronization by NC control.

With this arrangement, the slides 3 on the saddles 2 reciprocate in the direction of Y axis on a certain cycle while the spindle head 5 rocks on the pin 4 in the direction of X axis on a certain cycle. A combination of the movements in the directions of X axis and Y axis allows the cutter 11 to turn about the outer periphery of the pin or journal part of the crankshaft. As the cutter 11 is rotated in a specified direction by the actuation of the cutter motor 12 at that time, the outer periphery of the pin or journal part is cut by the cutting teeth 11a of the cutter 11.

Data on the workpiece are input in an NC device that serves as the control unit for the crankshaft milling machine. The data include the cutting diameter; orientation (i.e., the position in the rotating direction); stroke (i.e., the distance from the center of the rotation of the crankshaft)and lengthwise dimension of a part to be processed such as the pin part of the crankshaft. In the NC device, processing data such as the diameter of the circular path followed by the center of the cutter 11 and the center of the circular path are prepared according to the input data, and based on the processing data, the motor for rocking movement 9, slide motor etc. are controlled.

When a workpiece is machined with such a crankshaft milling machine, accuracy for processing may deteriorate owing to thermal displacement of the spindle head 5 caused by heat generation or owing to wear of the cutting tool. Taking such an undesirable situation into account, the NC device of this embodiment incorporates a system for automatically making corrections on the processing data according to thermal conditions and conditions associated with machining accuracy. Specifically, the memory provided in the NC device stores a temperature-related processing data table and accuracy-related processing data table in addition to a basic data table indispensable for operation. The temperature-related processing data table includes test data related to the diameter of the circular path followed by the center of the cutter 11, the center of the circular path etc. in correspondence with temperature data obtained from measurement in a specified position in the crankshaft milling machine. The accuracy-related processing data table includes processing data such as the outer diameter, orientation, stroke, lengthwise dimension of a pin or journal which needs to be processed as the cutting tool wears. The temperature data is preferably detection data supplied frown a temperature detector 16 that is attached to the spindle head 5 with its leading end positioned in the vicinity of the rim of the bearing 10 as shown in FIG. 3.

In the crankshaft milling machine of this embodiment, when the pin part of a crankshaft for example is machined by the actuation of the motor for rocking movement 9 and slide motor etc., the basic data table is first accessed with input data such as cutting conditions, and then, the basic processing data related to the diameter of the circular path followed by the center of the cutter 11, the center of the circular path etc. is prepared. Based on the basic processing data, the motor for rocking movement 9 and other members are controlled.

If there occurs a rise in the temperature of the machine body during machining operation, the temperature detector 16 measures temperature at a specified position in the vicinity of the periphery of the journal 10 as the representative temperature of the machine body and this detected temperature is input in the NC device as the temperature data. If the cutting tool etc. wears, data obtained from wear detection is likewise input in the NC device. In the NC device, temperature-related processing data corresponding to the temperature data is obtained from the temperature-related processing data table, while accuracy-related processing data corresponding to the degree of wear of the cutting tool etc. is obtained from the accuracy-related processing data table. The temperature-related and accuracy-related processing data thus obtained are compared to the basic processing data, thereby finally computing correction data (i.e., temperature-related correction data and accuracy-related correction data). Based on the correction data finally obtained, the basic processing data is corrected and the motor for rocking movement 9 and other members are controlled according to the corrected data.

Figure 4A:
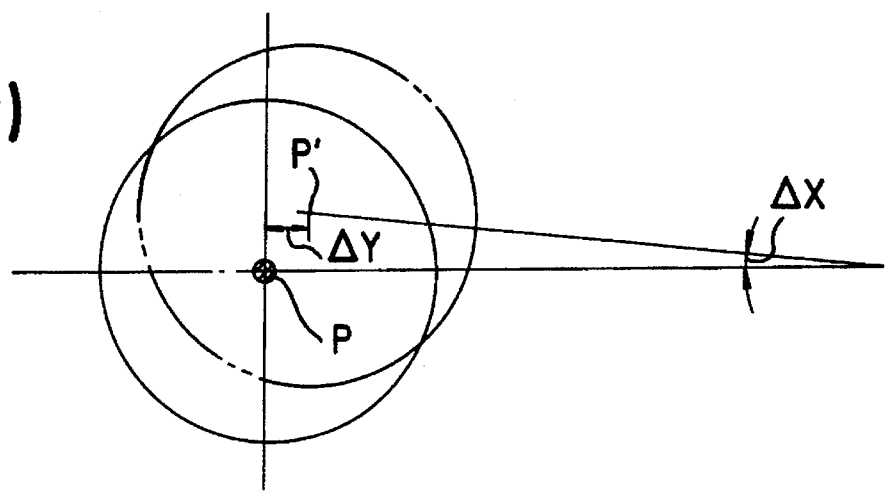
Figure 4B:
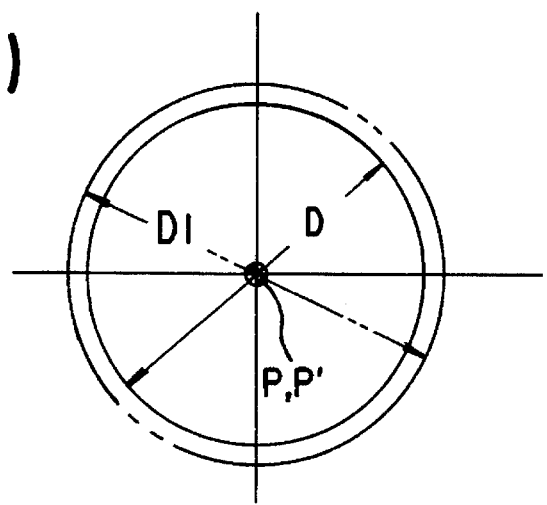

In this case, the correction data related to the center of the circular path followed by the center of the cutter 11 is obtained in the following way: As shown in FIG. 4(a), the difference between the temperature-related processing data and the basic processing data, that is, the deviation ΔX of the rotation angle of the spindle head 5 rotating about the pin 4 and the deviation ΔY of the position of the slide 3 in its sliding direction, is obtained. Regarding the correction data related to the diameter of the circular path followed by the center of the cutter 11, the magnification ($R=D_1/D$) of the expansion or reduction of the diameter in the temperature-related/accuracy-related processing data with respect to the diameter in the basic processing data is obtained as shown in FIG. 4(b). The circles shown in FIG. 4 are a circular path followed by the center of the cutter 11 during processing. The solid line represents the basic processing data while the two-dot chain line represents the temperature-related/accuracy-related processing data. P and P' represent the center of the pin part of the workpiece (i.e., crankshaft) in the basic processing data and the temperature-related/accuracy-related processing data, respectively.

According to the embodiment, machining accuracy varying with thermal displacement of a machine and wear of cutting tool etc. is adjusted by computing the deviation and magnification of the temperature-related/accuracy-related processing data with respect to the basic processing data, so that high-accuracy correction can be performed rapidly without recalculating the coordinates of the periphery of the circular path followed by the center of the cutter 11.

In the crankshaft milling machine of the foregoing embodiment, a workpiece is machined through a combination of the rocking movement and reciprocating movement of the spindle head moving in relation to the pin, the rocking movement taking place in the direction of X axis while the reciprocating movement in the direction of Y axis. The invention is also applicable to a crankshaft milling machine in which milling operation is performed through a combination of the reciprocating movements of the entire spindle head in a vertical direction and in the direction of Y axis.

While temperature at a position in the vicinity of the periphery of the bearing 10 of the inner-tooth milling cutter 11 is measured as the representative temperature of the machine body in the foregoing embodiment, the temperature data may be obtained by measurement of temperature at other positions in the crankshaft milling machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The crankshaft milling machine control system of the invention has the capability of automatically, rapidly adjusting machining accuracy that varies with thermal displacement of a machine. The position where temperature is detected for obtaining the temperature-related correction data is in the vicinity of the bearing of the inner-tooth milling cutter, which enables it to more accurately measure the fluctuation of heat generated during machining operation, so that the adverse influence of heat fluctuation can be avoided, ensuring high-accuracy correction.

I claim:

1. A crankshaft milling machine control system for controlling a crankshaft milling machine wherein the vertical movement and horizontal movement of a spindle head having an inner-tooth milling cutter are combined to put the inner-tooth milling cutter in circular motion, thereby cutting a workpiece fixedly supported at both ends thereof, the control system comprising:

(a) basic processing data setting means for setting basic processing data for the workpiece related to a diameter of a circular path followed by the center of the inner tooth milling cutter and to the center of the circular path in accordance with input work data;

(b) spindle head controlling means for controlling the vertical movement and horizontal movement of the spindle head in accordance with the output of the basic processing data setting means;

(c) temperature detecting means for detecting the temperature of the crankshaft milling machine at a specified position during machining operation, wherein the temperature detecting means detects temperature at a position in the vicinity of the bearing part of the inner-tooth milling cutter;

(d) temperature-related correction data computing means for looking up temperature-related processing data in a table with the output of the temperature detecting means and computing temperature-related correction data from the comparison between the temperature-related processing data and the basic processing data; and (e) processing data correcting means for correcting the basic processing data for the workpiece set by the basic processing data setting means in accordance with the temperature-related correction data computed by the temperature-related correction data computing means.

2. The crankshaft milling machine control system as claimed in claim 1, wherein the temperature-related correction data computing means computes the temperature-related correction data associated with the diameter of the circular path followed by the center of the inner-tooth milling cutter by calculating the magnification of the diameter according to the temperature-related processing data with respect to the diameter according to the basic processing data.

3. The crankshaft milling machine control system as claimed in claim 1, wherein the temperature-related correction data computing means computes the temperature-related correction data associated with the center of the circular path followed by the center of the inner-tooth milling cutter by calculating the deviation of the center according to the temperature-related processing data from the center according to the basic processing data.

* * * * *